(12) United States Patent
Steele, Jr.

(10) Patent No.: US 7,016,928 B2
(45) Date of Patent: Mar. 21, 2006

(54) FLOATING POINT STATUS INFORMATION TESTING CIRCUIT

(75) Inventor: Guy L. Steele, Jr., Lexington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 422 days.

(21) Appl. No.: 10/035,741

(22) Filed: Dec. 28, 2001

(65) Prior Publication Data

US 2002/0178199 A1   Nov. 28, 2002

Related U.S. Application Data (60) Provisional application No. 60/293,173, filed on May 25, 2001.

(51) Int. Cl.
*G06F 7/00*   (2006.01)

(52) U.S. Cl. ...................................... 708/495; 708/525
(58) Field of Classification Search ................ 708/495, 708/525
See application file for complete search history.

(56) References Cited

U.S. PATENT DOCUMENTS

| | | | |
|---|---|---|---|
| 3,725,649 A | 4/1973 | Deerfield | |
| 4,777,613 A | 10/1988 | Shahan et al. | |
| 4,788,655 A | 11/1988 | Nakayama et al. | |
| 4,991,131 A | 2/1991 | Yeh et al. | |
| 5,065,352 A | 11/1991 | Nakano | |
| 5,126,963 A | 6/1992 | Fukasawa | |
| 5,161,117 A | 11/1992 | Waggener, Jr. | |
| 5,249,149 A | 9/1993 | Cocanougher et al. | |
| 5,307,303 A | 4/1994 | Briggs et al. | |
| 5,347,481 A | 9/1994 | Williams ............... 364/748 |
| 5,347,482 A | 9/1994 | Williams ............... 364/757 |
| 5,357,237 A | 10/1994 | Bearden et al. | |
| 5,363,321 A | 11/1994 | Dao Trong et al. | |
| 5,365,465 A | 11/1994 | Larson | |
| 5,481,489 A * | 1/1996 | Yanagida et al. ........... 708/525 |
| 5,570,310 A | 10/1996 | Smith | |
| 5,666,301 A | 9/1997 | Makino | |
| 5,748,516 A | 5/1998 | Goddard et al. | |
| 5,812,439 A | 9/1998 | Hansen | |
| 5,862,066 A | 1/1999 | Rossin et al. | |
| 5,892,697 A | 4/1999 | Brakefield | |
| 5,931,943 A | 8/1999 | Orup | |
| 5,953,241 A * | 9/1999 | Hansen et al. ............. 708/501 |

(Continued)

OTHER PUBLICATIONS

Title: "Safe Treatment of Overflow and Underflow Conditions", by Robert A. Fraley & J. Stephen Walther, Hewlett-Packard Co., pp. 1-5.

(Continued)

*Primary Examiner*—D. H. Malzahn
(74) *Attorney, Agent, or Firm*—Finnegan, Henderson, Farabow, Garrett & Dunner, L.L.P.

(57) ABSTRACT

A floating point operand testing circuit includes an analysis circuit and a result generator circuit coupled to the analysis circuit. The analysis circuit determines the status of a floating point operand based upon data within the operand. An operand buffer may supply the operand to the analysis circuit. The result generator circuit is responsive to at least one control signal and asserts a result signal if the floating point analysis circuit matches the floating point status to a predetermined format specified by the control signal. The result signal can condition the outcome of a floating point instruction. The result generator may also respond to multiple control signals asserted when testing a single operand for different formats, such as not-a-number (NaN), infinity, normalized, denormalized, invalid operation, overflow, underflow, division by zero, exact, and inexact.

35 Claims, 2 Drawing Sheets

U.S. PATENT DOCUMENTS

| | | | |
|---|---|---|---|
| 5,963,461 A | 10/1999 | Gorshtein et al. | |
| 5,978,901 A | 11/1999 | Luedtke et al. | |
| 5,995,991 A | 11/1999 | Huang et al. | |
| 6,009,511 A | 12/1999 | Lynch et al. | 712/222 |
| 6,049,865 A | 4/2000 | Smith | |
| 6,081,823 A | 6/2000 | Purcell et al. | |
| 6,105,047 A | 8/2000 | Sharangpani et al. | |
| 6,108,772 A | 8/2000 | Sharangpani | |
| 6,131,106 A | 10/2000 | Steele, Jr. | 708/510 |
| 6,138,135 A * | 10/2000 | Karp | 708/496 |
| 6,151,669 A | 11/2000 | Huck et al. | |
| 6,189,094 B1 | 2/2001 | Hinds et al. | |
| 6,205,460 B1 | 3/2001 | Steele, Jr. | |
| 6,219,685 B1 | 4/2001 | Story | |
| 6,256,655 B1 | 7/2001 | Ezer et al. | |
| 6,286,023 B1 | 9/2001 | Purcell et al. | |
| 6,286,024 B1 | 9/2001 | Yano et al. | |
| 6,360,189 B1 | 3/2002 | Hinds et al. | |
| 6,393,555 B1 | 5/2002 | Meier et al. | |
| 6,490,607 B1 | 12/2002 | Oberman | |
| 6,571,265 B1 | 5/2003 | Story | |
| 6,594,681 B1 | 7/2003 | Prabhu | |
| 6,629,120 B1 | 9/2003 | Walster et al. | |
| 6,658,443 B1 | 12/2003 | Walster | |
| 6,658,444 B1 | 12/2003 | Walster et al. | |
| 6,697,832 B1 | 2/2004 | Kelley et al. | |
| 6,732,134 B1 * | 5/2004 | Rosenberg et al. | 708/495 |
| 6,789,098 B1 | 9/2004 | Dijkstra | |
| 2002/0194232 A1 | 12/2002 | Walster | |
| 2003/0033335 A1 | 2/2003 | Walster | |

OTHER PUBLICATIONS

Title: "Vax Floating Point: A Solid Foundation for Numerical Computation", by Mary Payne & Dileep Bhandarkar, Digital Equipment Corp., pp. 1-12.

Title: Lecture Notes on the Status of "IEEE Standard 754 for Binary Floating-Point Arithmetic", by Prof. W. Kahan, May 31, 1996, pp. 1-30.

Title: "Interval Arithmetic Specification" by Dmitri Chiriaev & G. William Walster, Draft revised May 4, 1998, pp. 1-78.

Title: "IEEE Standard for Binary Floating-Point Arithmetic IEEE Standard 754-1985," by Standards Committee of the IEEE Computer Society, The Institute of Electrical and Electronics Engineers, Inc., copyright 1985, pp. 1-14.

U.S. Appl. No. 10/028,375, filed Dec. 28, 2001, Steele, Jr.
U.S. Appl. No. 10/035,579, filed Dec, 28, 2001, Steele, Jr.
U.S. Appl. No. 10/035,580, filed Dec. 28, 2001, Steele, Jr.
U.S. Appl. No. 10/035,581, filed Dec. 28, 2001, Steele, Jr.
U.S. Appl. No. 10/035,582, filed Dec. 28, 2001, Steele, Jr.
U.S. Appl. No. 10/035,583, filed Dec. 28, 2001, Steele, Jr.
U.S. Appl. No. 10/035,584, filed Dec. 28, 2001, Steele, Jr.
U.S. Appl. No. 10/035,585, filed Dec. 28, 2001, Steele, Jr.
U.S. Appl. No. 10/035,586, filed Dec. 28, 2001, Steele, Jr.
U.S. Appl. No. 10/035,587, filed Dec. 28, 2001, Steele, Jr.
U.S. Appl. No. 10/035,589, filed Dec. 28, 2001, Steele, Jr.
U.S. Appl. No. 10/035,595, filed Dec. 28, 2001, Steele, Jr.
U.S. Appl. No. 10/035,647, filed Dec. 28, 2001, Steele, Jr.
U.S. Appl. No. 10/035,674, filed Dec. 28, 2001, Steele, Jr.
U.S. Appl. No. 10/035,746, filed Dec. 28, 2001, Steele, Jr.
U.S. Appl. No. 10/035,747, filed Dec. 28, 2001, Steele, Jr.
U.S. Appl. No. 10/036,133, filed Dec. 28, 2001, Steele, Jr.
U.S. Appl. No. 10/320,547, filed Dec. 17, 2002, Steele, Jr.
U.S. Appl. No. 10/320,450, filed Dec. 17, 2002, Steele, Jr.
Office Action mailed May 9, 2005 in U.S. Appl. No. 10/035,674.

* cited by examiner

FLOATING POINT STATUS INFORMATION TESTING CIRCUIT

This application claims the benefit of Provisional Application No. 60/293,173, filed May 25, 2001.

RELATED APPLICATIONS

Related U.S. patent application Ser. No. 10/035,747, filed on even date herewith in the name of Guy L. Steele Jr. and entitled "Floating Point System That Represents Status Flag Information Within A Floating Point Operand," assigned to the assignee of the present application, is hereby incorporated by reference.

DESCRIPTION OF THE INVENTION

1. Field of the Invention

The invention related generally to systems and methods for performing floating point operations, and more particularly to systems and methods for selectively testing a floating point operand determining the condition of floating point status information associated with a floating point operand.

2. Background of the Invention

Digital electronic devices, such as digital computers, calculators and other devices, perform arithmetic calculations on values in integer, or "fixed point," format, in fractional, or "floating point" format, or both. Institute of Electrical and Electronic Engineers (IEEE) Standard 754, (hereinafter "IEEE Std. 754" or "the Standard") published in 1985 and adopted by the American National Standards Institute (ANSI), defines several standard formats for expressing values in floating point format, and a number of aspects regarding behavior of computation in connection therewith. In accordance with IEEE Std. 754, a representation in floating point format comprises a plurality of binary digits, or "bits," having the structure $$se_{msb} \ldots e_{lsb}f_{msb} \ldots f_{lsb}$$

where bit "s" is a sign bit indicating whether the entire value is positive or negative, bits "$e_{msb} \ldots e_{lsb}$" comprise an exponent field that represents the exponent "e" in unsigned binary biased format, and bits "$f_{msb} \ldots f_{lsb}$" comprise a fraction field that represents the fractional portion "f" in unsigned binary format ("msb" represents "most significant bit" and "lsb" represents "least significant bit"). The Standard defines two general formats. A "single" format comprises thirty-two bits while a "double" format comprises sixty-four bits. In the single format, there is one sign bit "s," eight bits "$e_7 \ldots e_0$" comprising the exponent field and twenty-three bits "$f_{22} \ldots f_0$" comprising the fraction field. In the double format, there is one sign bit "s," eleven bits "$e_{10} \ldots e_0$" comprising the exponent field and fifty-two bits "$f_{51} \ldots f_0$" comprising the fraction field.

As indicated above, the exponent field of the floating point representation "$e_{msb} \ldots e_{lsb}$" represents the exponent "E" in biased format. The biased format provides a mechanism by which the sign of the exponent is implicitly indicated. In particular, the bits "$e_{msb} \ldots e_{lsb}$" represent a binary encoded value "e" such that "e=E+bias." This allows the exponent E to extend from −126 to +127, in the eight-bit "single" format, and from −1022 to +1023 in the eleven-bit "double" format, and provides for relatively easy manipulation of the exponents in multiplication and division operations, in which the exponents are added and subtracted, respectively.

IEEE Std. 754 provides for several different formats with both the single and double formats which are generally based on the bit patterns of the bits "$e_{msb} \ldots e_{lsb}$" comprising the exponent field and the bits "$f_{msb} f_{lsb}$" comprising the fraction field. If a number is represented such that all of the bits "$e_{msb} \ldots e_{lsb}$" of the exponent field are binary one's (i.e., if the bits represent a binary-encoded value of "255" in the single format or "2047" in the double format) and all of the bits "$f_{msb} \ldots f_{lsb}$" of the fraction field are binary zeros, then the value of the number is positive or negative infinity, depending on the value of the sign bit "s." In particular, the value "v" is $v=(-1)^s\infty$, where "$\infty$" represents the value "infinity." On the other hand, if all of the bits "$e_{msb} \ldots e_{lsb}$" of the exponent field are binary one's and if the bits "$f_{msb} \ldots f_{lsb}$" of the fraction field are not all zero's, then the value that is represented is deemed "not a number," which is abbreviated in the Standard by "NaN."

If a number has an exponent field in which the bits "$e_{msb} \ldots e_{lsb}$" are neither all binary ones nor all binary zeros (i.e., if the bits represent a binary-encoded value between 1 and 254 in the single format or between 1 and 2046 in the double format), the number is said to be a "normalized" format. For a number in the normalized format, the value represented by the number is $v=(-1)^S 2^{e-bias}(1.lf_{msb} \ldots f \ldots{}_{lsb})$, where "|" represents a concatenation operation. Effectively, in the normalized format, there is an implicit most significant digit having the value "one," so that the twenty-three digits in the fraction field of the single format, or the fifty-two digits in the fraction field of the double format, will effectively represent a value having twenty-four digits or fifty-three digits of precision, respectively, where the value is less than two, but not less than one.

On the other hand, if a number has an exponent field in which the bits "$e_{msb} \ldots e_{lsb}$" are all binary zeros, representing the binary-encoded value of "zero," and a fraction field in which the bits $f_{msb} \ldots f_{lsb}$ are not all zero, the number is said to be a "de-normalized" format. For a number in the de-normalized format, the value represented by the number is $v=(-1)^s 2^{e-bias+1}(0.lf_{msb} \ldots f_{lsb})$. It will be appreciated that the range of values of numbers that can be expressed in the de-normalized format is disjoint from the range of values of numbers that can be expressed in the normalized format, for both the single and double formats. Finally, if a number has an exponent field in which the bits "$e_{msb} \ldots e_{lsb}$" are all binary zeros, representing the binary-encoded value of "zero," and a fraction field in which the bits $f_{msb} \ldots f_{lsb}$ are all zero, the number has the value "zero". It will be appreciated that the value "zero" may be positive zero or negative zero, depending on the value of the sign bit.

Generally, circuits or devices that perform floating point computations or operations (generally referred to as floating point units) conforming to IEEE Std. 754 are designed to generate a result in three steps:

(a) In the first step, an approximation calculation step, an approximation to the absolutely accurate mathematical result (assuming that the input operands represent the specific mathematical values as described by IEEE Std. 754) is calculated that is sufficiently precise as to allow this accurate mathematical result to be summarized. The summarized result is usually represented by a sign bit, an exponent (typically represented using more bits than are used for an exponent in the standard floating-point format), and some number "N" of bits of the presumed result fraction, plus a guard bit and a sticky bit. The value of the exponent will be such that the value of the fraction generated in step (a) consists of a 1 before the binary point and a fraction after the binary point. The bits are commonly calculated so as to obtain the same result as the following conceptual procedure (which is impossible under some circumstances to carry out in practice): calculate the mathematical result to an infinite number of bits of precision in binary scientific notation, and in such a way that there is no bit position in the significand such that all bits of lesser significance are 1-bits (this restriction avoids the ambiguity between, for example, 1.100000 . . . and 1.011111 . . . as representations of the value "one-and-one-half"); let the N most significant bits of the infinite significand be used as the intermediate result significand; let the next bit of the infinite significand be the guard bit; and let the sticky bit be 0 if and only if ALL remaining bits of the infinite significand are 0-bits (in other words, the sticky bit is the logical OR of all remaining bits of the infinite fraction after the guard bit).

(b) In the second step, a rounding step, the guard bit, the sticky bit, perhaps the sign bit, and perhaps some of the bits of the presumed significand generated in step (a) are used to decide whether to alter the result of step (a). For conventional rounding modes defined by IEEE Std. 754, this is a decision as to whether to increase the magnitude of the number represented by the presumed exponent and fraction generated in step (a). Increasing the magnitude of the number is done by adding I to the significand in its least significant bit position, as if the significand were a binary integer. It will be appreciated that, if the significand is all 1-bits, the magnitude of the number is "increased" by changing it to a high-order 1-bit followed by all 0-bits and adding 1 to the exponent.

Regarding the rounding modes, it will be further appreciated that, (i) if the result is a positive number, and
  (a) if the decision is made to increase, effectively the decision has been made to increase the value of the result, thereby rounding the result up (i.e., towards positive infinity), but
  (b) if the decision is made not to increase, effectively the decision has been made to decrease the value of the result, thereby rounding the result down (i.e., towards negative infinity); and
(ii) if the result is a negative number, and
  (a) if the decision is made to increase, effectively the decision has been made to decrease the value of the result, thereby rounding the result down, but
  (b) if the decision is made not to increase, effectively the decision has been made to increase the value of the result, thereby rounding the result up.

(c) In the third step, a packaging step, a result is packaged into a standard floating-point format. This may involve substituting a special representation, such as the representation defined for infinity or NaN if an exceptional situation (such as overflow, underflow, or an invalid operation) was detected. Alternatively, this may involve removing the leading 1-bit (if any) of the fraction, because such leading 1-bits are implicit in the standard format. As another alternative, this may involve shifting the fraction in order to construct a denormalized number. As a specific example, it is assumed that this is the step that forces the result to be a NaN if any input operand is a NaN. In this step, the decision is also made as to whether the result should be an infinity. It will be appreciated that, if the result is to be a NaN or infinity, the original result will be discarded and an appropriate representation will be provided as the result.

In addition in the packaging step, floating point status information is generated, which is stored in a floating point status register. The floating point status information generated for a particular floating point operation includes indications, for example, as to whether (i) a particular operand is invalid for the operation to be performed ("invalid operation");
(ii) if the operation to be performed is division, the divisor is zero ("division-by-zero");
(iii) an overflow occurred during the operation ("overflow");
(iv) an underflow occurred during the operation ("underflow"); and
(v) the round result of the operation is not exact ("inexact").

These conditions are typically represented by flags that are stored in the floating point status register. The floating point status information can be used to dynamically control the operations in response to certain instructions, such as conditional branch, conditional move, and conditional trap instructions that may be in the instruction stream subsequent to the floating point instruction. Also, the floating point status information may enable processing of a trap sequence, which will interrupt the normal flow of program execution. In addition, the floating point status information may be used to affect certain ones of the functional unit control signals that control the rounding mode. IEEE Std. 754 also provides for accumulating floating point status information from, for example, results generated for a series or plurality of floating point operations.

IEEE Std. 754 has brought relative harmony and stability to floating-point computation and architectural design of floating-point units. Moreover, its design was based on some important principles, and rests on a sensible mathematical semantics that eases the job of programmers and numerical analysts. It also supports the implementation of interval arithmetic, which may prove to be preferable to simple scalar arithmetic for many tasks. Nevertheless, IEEE Std. 754 has some serious drawbacks, including:

(i) Modes (e.g., the rounding modes and traps enabled/disabled mode), flags (e.g., flags representing the status information and traps required to implement IEEE Std. 754 introduce implicit serialization issues. Implicit serialization is essentially the need for serial control of access (read/write) to and from globally used registers, such as a conventional floating point status register. Under IEEE Std. 754, implicit serialization may arise between (1) different concurrent floating-point instructions and (2) between floating point instructions and the instructions that read and write the flags and modes. Furthermore, rounding modes may introduce implicit serialization because they are typically indicated as global state, although in some microprocessor architectures, the rounding mode is encoded as part of the instruction operation code, which will alleviate this problem to that extent. Thus, the potential for implicit serialization makes the Standard difficult to implement coherently and efficiently in today's superscalar and parallel processing architectures without loss of performance.

(ii) The implicit side effects of a procedure that can change the flags or modes can make it very difficult for compilers to perform optimizations on floating point code. As a result, compilers for most languages usually assume that every procedure call is an optimization barrier in order to be safe. This unfortunately may lead to further loss of performance.

(iii) Global flags, such as those that signal certain modes, make it more difficult to do instruction scheduling where the best performance is provided by interleaving instructions of unrelated computations. Thus, instructions from regions of code governed by different flag settings or different flag detection requirements cannot easily be interleaved when they must share a single set of global flag bits.

(iv) Furthermore, traps have been difficult to integrate efficiently into computing architectures and programming language designs for fine-grained control of algorithmic behavior.

Thus, there is a need for a system that avoids such problems when performing floating point operations and, in particular, when testing for status information related to a floating point operand.

SUMMARY OF THE INVENTION

Methods, systems, and articles of manufacture consistent with the present invention overcome these shortcomings with a floating point testing circuit for testing a floating point operand having status information encoded within the operand itself. This circuit determines the status condition of the operand without requiring use or access to a separate floating point status register and identifies whether the status condition is of a selected type.

More particularly stated, a floating point operand testing circuit consistent with the present invention, as embodied and broadly described herein, includes an analysis circuit and a result generator circuit coupled to the analysis circuit. The analysis circuit can determine the status of the floating point operand based upon data within the floating point operand. An operand buffer may be coupled to the analysis circuit and configured to supply the floating point operand to the analysis circuit.

The result generator circuit is responsive to at least one control signal. Further, the result generator is configured to assert one or more result signals if the floating point analysis circuit indicates the floating point status is of a predetermined format specified by the at least one control signal. The result signal may be used to condition the outcome of a floating point instruction.

The result generator circuit may also be responsive to at least one of a plurality of control signals that is asserted when testing the same floating point operand for one of a plurality of predetermined formats.

The data within the floating point operand typically encodes the status in the predetermined format. Such a predetermined format may be one or a combination from a group comprising not-a-number (NaN), infinity, normalized, denormalized, invalid operation, overflow, underflow, division by zero, exact, and inexact. In more detail, the predetermined format may represent a +OV status, a –OV status, a +UN status, a –UN status, a positive infinity status or a negative infinity status. The predetermined format may also comprise a plurality of bits indicative of a predetermined type of operand condition resulting in the NaN status or the infinity status.

The result generator may also update the result signal to indicate that the floating point operand is of an alternative format specified by an updated value of the at least one control signal. Similar to the predetermined format, the alternative format may be one or a combination of NaN, infinity, normalized, denormalized, invalid operation, overflow, underflow, division by zero, exact, or inexact.

In another aspect of the present invention, a floating point operand testing circuit consistent with an embodiment of the present invention is described that includes an analysis circuit, an operand buffer and a result generator circuit. The analysis circuit is configured to determine the status of the floating point operand based only on the contents of the floating point operand. The operand buffer is coupled to the analysis circuit and configured to store the floating point operand encoded with the status.

The result generator circuit is coupled to the analysis circuit and provides a result signal in response to at least one control signal. The result signal is indicative of whether the status of the floating point operand conforms to a predetermined format associated with the control signal. The control signal may be implemented as a group of control signals that are asserted in order to test the floating point operand for different status conditions.

The predetermined format may be one or a combination from a group comprising NaN, infinity, normalized, denormalized, invalid operation, overflow, underflow, division by zero, exact, or inexact. In more detail, the predetermined format may represent a +OV status, a –OV status, a +UN status, a –UN status, a positive infinity status and a negative infinity status. Further, the predetermined format may include a bits indicative of a predetermined type of operand condition resulting in the NaN status.

In yet another aspect of the present invention, a method for testing a floating point status condition of a floating point operand consistent with an embodiment of the present invention is described that begins with receiving the floating point operand. The floating point status of the operand is determined from only the contents of the floating point operand. At least one control signal is received and then a result signal is generated. The result signal indicates whether the status of the floating point operand conforms to a predetermined format associated with the control signal. The stages of receiving a control signal and generating a result signal may be repeated in order to test the same operand for different status conditions.

The predetermined format may include one or a combination of not-a-number (NaN), infinity, normalized, denormalized, invalid operation, overflow, underflow, division by zero, exact, or inexact. In more detail, the predetermined format may represent a +OV status, a –OV status, a +UN status, a –UN status, a positive infinity status or a negative infinity status. Furthermore, the predetermined format for the NaN may include bits indicative of a predetermined type of operand condition resulting in the NaN status.

Additionally, the method may include conditioning the outcome of a floating point instruction based upon the value of the result signal. This advantageously allows for conditional processing without relying upon the contents of a separate floating point status register, which may have undesirably been overwritten.

In still another aspect of the present invention, a computer-readable medium is described that is consistent with an embodiment of the present invention. The medium stores a set of instructions for testing a floating point status condition of a floating point operand. When executed, the instructions perform a method as described above or herein.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to exemplary embodiments of the present invention, examples of which are illustrated in the accompanying drawings. Wherever possible, the same reference numbers will be used throughout the drawings to refer to the same or like parts.

Related U.S. patent application Ser. No. 10/035,747, which has previously been incorporated by reference, describes an exemplary floating point unit in which floating point status information is encoded in the representations of the results generated thereby. The exemplary floating point unit includes a plurality of functional units, including an adder unit, a multiplier unit, a divider unit, a square root unit, a maximum/minimum unit, a comparator unit and a tester unit, all of which operate under control of functional unit control signals provided by a control unit. The present application is directed to an exemplary tester unit that can be used in floating point operations with the floating point unit described in related U.S. patent application Ser. No. 10/035,747.

Figure 1:
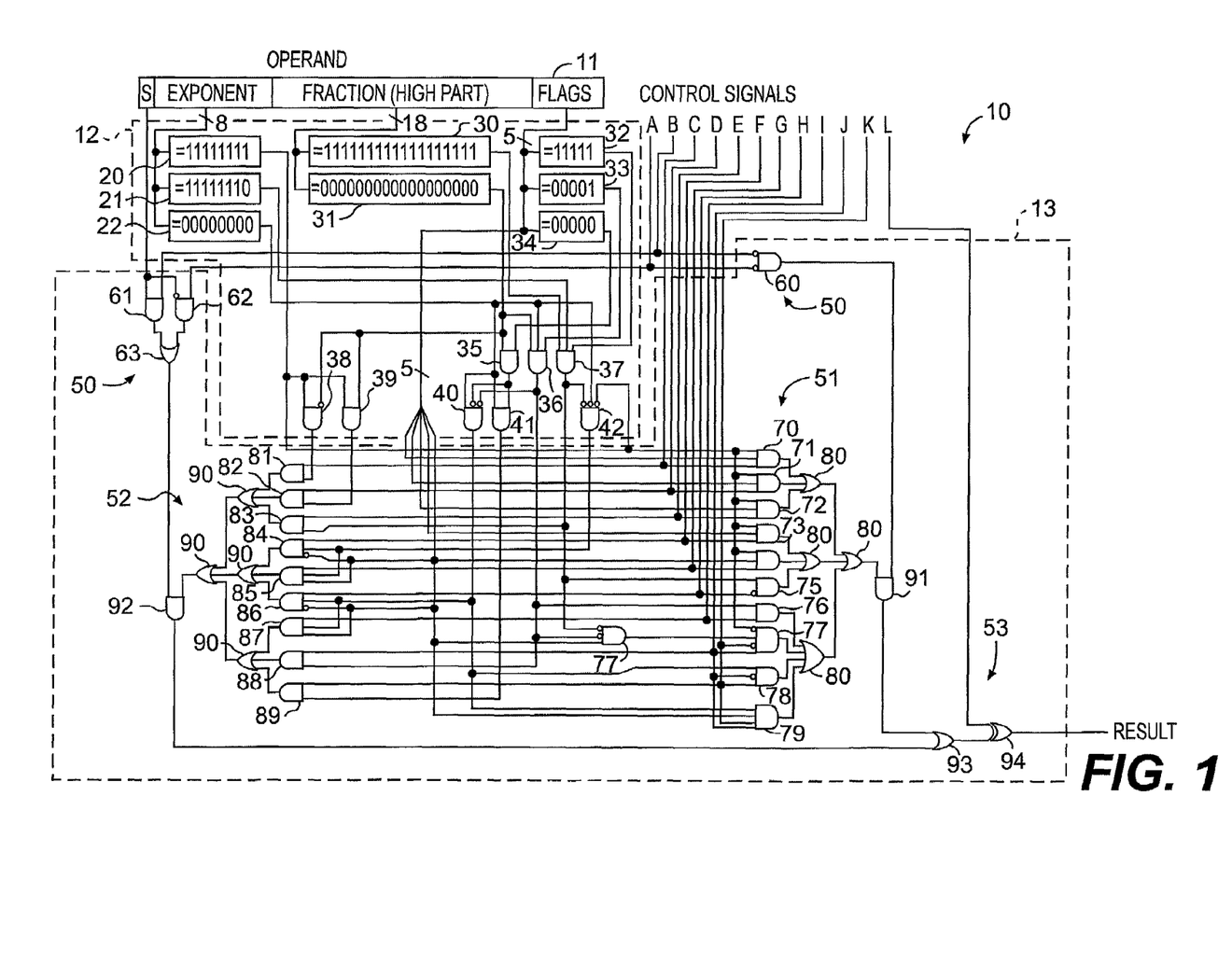
FIG. 1 is a functional block diagram of an exemplary tester unit for selectively determining the condition of status information associated with a floating point operand, consistent with an exemplary embodiment of the present invention.

FIG. 1 is a functional block diagram of an exemplary tester unit 10 for selectively determining the condition of status information associated with a floating point operand, constructed in accordance with the invention. Generally, the tester unit 10 receives a floating point operand and generates a result selectively indicating the condition of status information that is encoded therein and comprises a part thereof. Since the floating point status information comprises part of the floating point representation of the operand instead of being separate and apart from the operand as in prior art tester units, there is no need nor desire to access any external circuitry (e.g., floating point status register). Thus, the implicit serialization that is required by maintaining the floating point status information separate and apart from the operand can be advantageously obviated.

Figure 2:
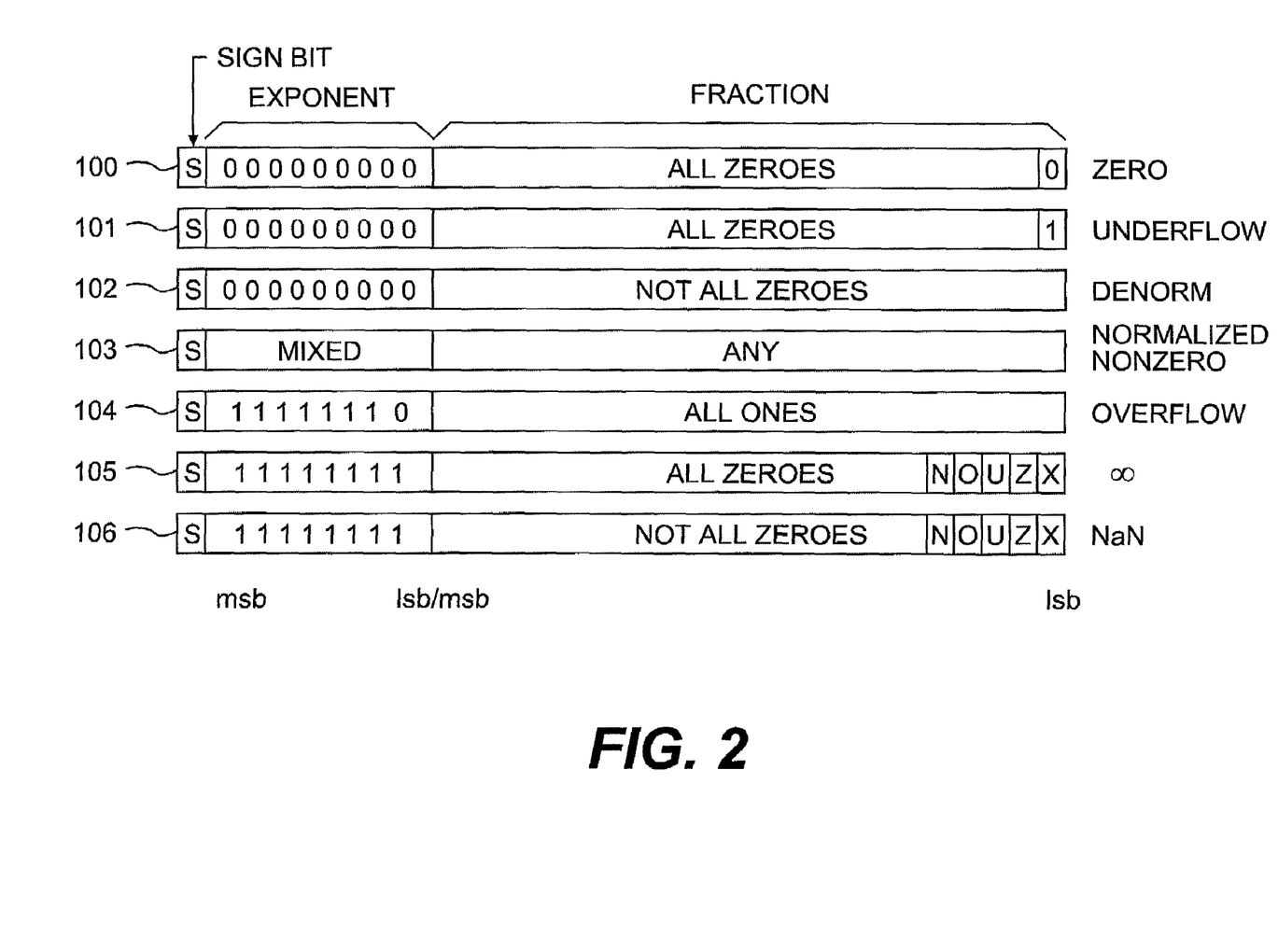
FIG. 2 depicts exemplary formats for representations of floating point operands, the status of which is determined by the exemplary tester unit depicted in FIG. 1 and which is consistent with an exemplary embodiment of the present invention.

The operands received by the tester circuit 10 can be in ones of a plurality of exemplary formats, which will be illustrated in connection with FIG. 2. With reference to FIG. 2, seven exemplary formats are depicted for floating point operands tested by tester circuit 10. These exemplary formats include a zero format 100, an underflow format 101, de-normalized format 102, a normalized non-zero format 103, an overflow format 104, an infinity format 105 and a not-a-number (NaN) format 106. The exemplary zero format 100 is used to represent the values "zero," or, more specifically, positive or negative zero, depending on the value of "s," the sign bit.

The exemplary underflow format 101 provides a mechanism by which the floating point status information testing circuit 10 can determine that the result of a computation is an overflow. In the underflow format, the sign bit "s" indicates whether the result is positive or negative, the bits $e_{msb} \ldots e_{lsb}$, of the exponent field are all binary zero's, and the bits $f_{msb} \ldots f_{lsb+1}$ of the fraction field, except for the least significant bit, are all binary zero's. The least significant bit $f_{lsb}$ of the fraction field is a binary one.

The exemplary de-normalized format 102 and exemplary normalized non-zero format 103 are used to represent finite non-zero floating point values substantially along the lines of that described above in connections with IEEE Std. 754. In both formats 102 and 103, the sign bit "s" indicates whether the result is positive or negative. The bits $e_{msb} \ldots e_{lsb}$ of the exponent field of the de-normalized format 102 are all binary zero's. However, the bits $e_{msb} \ldots e_{lsb}$ of the exponent field of the normalized non-zero format 103 are mixed one's and zero's, except that the exponent field of the normalized non-zero format 103 will not have a pattern in which bits $e_{msb} \ldots e_{lsb+1}$ are all binary ones and the least significant bit $e_{lab}$ zero and all of the bits $f_{msb} \ldots f_{lsb}$ of the fraction field are all binary one's. In exemplary format 102 the bits $f_{msb} \ldots f_{lsb+1}$ of the fraction field are not all binary zero's.

The exemplary overflow format 104 provides a mechanism by which the floating point status information testing circuit 10 can determine that the result of a computation is an overflow. In the overflow format 104, the sign bit "s" indicates whether the result is positive or negative, the bits $e_{msb} \ldots e_{lsb+1}$ of the exponent field are all binary ones, with the least significant bit $e_{lsb}$ being zero. The bits $f_{msb} \ldots f_{lsb}$ of the fraction field are all binary ones.

The exemplary infinity format 105 provides a mechanism by which the floating point status information testing circuit 10 can determine that its operand is infinite. In the infinity format 105, the sign bit "s" indicates whether the result is positive or negative, the bits $e_{msb} \ldots e_{lsb}$ of the exponent field are all binary ones, and the bits $f_{msb} \ldots f_{lsb+5}$ of the fraction field are all binary zero's. The five least significant bits $f_{lsb+4} \ldots f_{lsb}$ of the fraction field are flags, which will be further described below.

The exemplary NaN (not-a-number) format 106 provides a mechanism by which the floating point status information testing circuit 10 can determine that a result is not a number. In the NaN format, the sign bit "s" can be any value, the bits $e_{msb} \ldots e_{lsb}$ of the exponent field are all binary ones, and the bits $f_{msb} \ldots f_{lsb+5}$ of the fraction field are not all binary zero's. The five least significant bits $f_{msb+4} \ldots f_{lsb}$ of the fraction field are flags, which will be further described below.

As noted above, in values represented in the exemplary infinity format 105 and the exemplary NaN format 106, the five low order bits $f_{lsb+4} \ldots f_{lsb}$ of the fraction field are flags. In one embodiment, such as the exemplary formats used with the floating point status information testing circuit 10, the five flags include the flags that are defined by IEEE Std. 754. These flags include an invalid operation flag "n," an overflow flag "o," an underflow flag "u," a division-by-zero flag "z," and an inexact flag "x." For example, a value in the exemplary NaN format 106 in which both the overflow flag "o" and the division-by-zero flag "z" are set indicates that the value represents a result of a computation that involved an overflow (this from the overflow flag "o"), as well as an attempt to divide by zero (this from the division-by-zero flag "z"). In one embodiment, the flags may provide the same status information as provided by, for example, information stored in a floating point status register (not shown) in a floating point unit that includes floating point status information testing circuit 10.

In another embodiment, values in the other formats can be indicated as being inexact based in part on a particular bit, such as the least-significant bit $f_{lsb}$ of their fraction fields. In that embodiment, that particular bit operates as an inexact flag. Thus, the value will be indicated as being inexact if that particular bit, such as the bit $f_{lsb}$, has the value "one." Otherwise, the operand has an exact status.

With this background on the exemplary operand formats, the structure and operation of exemplary tester unit 10 will be described in connection with FIG. 1. With reference to FIG. 1, the exemplary tester unit 10 generally includes an operand buffer 11, an operand analysis circuit 12, and a result generator circuit 13. In basic operation, the operand buffer 11 receives and stores an operand from an external memory storage device, such as a set of general memory registers, in a conventional manner. The operand analysis circuit 12 analyzes the operand in the operand buffer 11 and generates signals providing information relating to the operand. These signals are provided to the result generator circuit 13. The signals provided by the operand analysis circuit 12 essentially provide information as to the type or format of the respective operand, such as indicating whether the operand is in the zero format 100, underflow format 101, de-normalized format 102, normalized non-zero format 103, the overflow format 104, infinity format 105, or the NaN format 106.

The result generator circuit 13 receives the signals from the operand analysis circuit 12, control signals A through L, and a signal from operand buffer 11. In response, the result generator circuit 13 generates a result signal. In an embodiment of the present invention, the control signals are provided by a control unit (not shown) within the floating point unit that includes exemplary tester unit 10. In more detail, these control signals may indicate the particular items of floating point status information that are to be tested in relation to the format of the operand within operand buffer 11. The result generator circuit 13 generates a result signal indicating whether the operand in operand buffer 11 conforms to the state specified by the control signals. Additionally, it will be appreciated that the result signal may be directly or indirectly coupled to the control unit for controlling its subsequent operations, e.g., an outcome of a conditional floating point operation or instruction.

Before proceeding to a detailed description of exemplary tester unit 10, it would be helpful to further describe the operation of exemplary tester unit 10 in relation to the control signals consistent with an embodiment of the present invention. In the illustrated embodiment, exemplary tester unit 10 receives twelve control signals, i.e., signals A–L. Control signals A and B control the operation of tester unit 10 in relation to control signals C–K. The L control signal enables the result indicated by the result signal to be complemented. Using controls signals A, B, and L, exemplary tester unit 10 selectively processes the operand to determine the appropriate value of the result signal.

In more detail regarding the exemplary embodiment, if both control signals A and B are negated and the L control is negated, asserting following additional control signals will result in the following values of the result signal:

(a) If the C control signal is asserted, the result signal is asserted if the operand in operand buffer 11 is in the NaN format 106 or the infinity format 105 and the "invalid operation" status flag ("n") is set, in which case the bit $f_{lsb+4}$ of the fraction field has the value "one."

(b) If the D control signal is asserted, the result signal is asserted if the operand in operand buffer 11 is in the NaN format 106 or the infinity format 105 and the "overflow" status flag ("o") is set, in which case the bit $f_{lsb+3}$ of the fraction field has the value "one."

(c) If the E control signal is asserted, the result signal is asserted if the operand in operand buffer 11 is in the NaN format 106 or the infinity format 105 and the "underflow" status flag ("u") is set, in which case the bit $f_{lsb+2}$ of the fraction field has the value "one."

(d) If the F control signal is asserted, the result signal is asserted if the operand in operand buffer 11 is in the NaN format 106 or the infinity format 105 and the "zero" status flag ("z") is set, in which case the bit $f_{lsb+1}$ of the fraction field has the value "one."

(e) If the G control signal is asserted, the result signal is asserted if the operand in operand buffer 11 is in the NaN format 106 or the infinity format 105 and the "inexact" status flag ("x") is set, in which case the bit $f_{lsb}$ of the fraction field has the value "one."

(f) If the H control signal is asserted, the result signal is asserted if the operand in operand buffer 11 is in the overflow format 104.

(g) If the I control signal is asserted, the result signal is asserted if the operand in operand buffer 11 is in the underflow format 101.

(h) If the J control signal is negated and the K control signal is asserted, the result signal is asserted if the operand in operand buffer 11 is in the de-normalized format 102.

(i) If the J Control signal is asserted and the K control signal is negated, the result signal is asserted if the operand in operand buffer 11 is in the de-normalized format 102 or normalized non-zero format 103 and the inexact flag is set, in which case the least-significant bit $f_{lsb}$ of the fraction field has the value "one."

(j) If both the J control signal and the K control signal are asserted, the result signal is asserted if the operand in operand buffer 11 is in the de-normalized format 102 and the inexact flag is set, in which case the least-significant bit $f_{lsb}$ of the field has the value "one."

Alternatively, if both control signals A and B are asserted and the L control is negated, asserting following additional controls signal will result in the following values of the result signal:

(k) If the C control signal is asserted, the result signal is asserted if the operand in operand buffer 11 is in the NaN format 106.

(l) If the D control signal is asserted, the result signal is asserted if the operand in operand buffer 11 is in the infinity format 105.

(m) If the E control signal is asserted, the result signal is asserted if the operand in operand buffer 11 is in the overflow format 104.

(n) If the F control signal is asserted, the result signal is asserted if the operand in operand buffer 11 is in the normalized non-zero format 103 with the inexact flag "x" clear, in which case the bit $f_{lsb}$ of the fraction field has the value "zero."

(o) If the G control signal is asserted, the result signal is asserted if the operand in operand buffer 11 is in the normalized non-zero format 103 with the exact flag "x" set, in which case the bit $f_{lsb}$ of the fraction field has the value "one."

(p) If the H control signal is asserted, the result signal is asserted if the operand in operand buffer 11 is in the de-normalized format 102 with the inexact flag "x" clear, in which case the bit $f_{lsb}$ of the fraction field has the value "zero."

(q) If the I control signal is asserted, the result signal is asserted if the operand in operand buffer 11 is in the de-normalized format 102 with the inexact flag "x" set, in which case the bit $f_{lsb}$ of the fraction field has the value "one".

(r) If the J control signal is asserted, the result signal is asserted if the operand in operand buffer 11 is in the underflow format 101.

(s) If the K control signal is asserted, the result signal is asserted if the operand in operand buffer 11 is in the zero format 100.

If the A control signal is negated and the B control signal is asserted, the exemplary tester unit 10 operates as described above in connection with (k) through (s) except that the result signal will be asserted only if the operand in operand buffer 11 is negative. Further, if the A control signal is asserted and the B control signal is negated the exemplary tester unit 10 operates as described above in connection with (k) through (s) except that the result signal will be asserted only if the operand in operand buffer 11 is positive. If the L signal is asserted, the result signal will be the complement of that described above.

With this background on the exemplary embodiment and with reference to FIG. 1, the exemplary operand analysis circuit 12 is a circuit having logical circuitry, such as comparators and other logical gates, that serve to identify the format of the operand in operand buffer 11. For example, exemplary operand analysis circuit 12 includes comparators 20, 21, 22, 30, 31, 32, 33, and 34 that respond to the contents of operand buffer 11.

In the exemplary embodiment, comparator 20 generates an asserted signal if the bits $e_{msb} \ldots e_{lsb}$ of the exponent field of the operand in operand buffer 11 are all binary one's, which will be the case if the operand is in the infinity format 105 or the NAN format 106.

Comparator 21 generates an asserted signal if the bits $e_{msb} \ldots e_{lsb+1}$ of the exponent field of the operand in the operand buffer 11 are all binary one's, and the bit $e_{lsb}$ is a binary zero, which will be the case if the operand is in the overflow format 104.

Comparator 22 generates an asserted signal if the bits $e_{msb} \ldots e_{lsb}$ of the exponent field of the operand in operand buffer 11 are all binary zero's, which will be the case if the operand is in the zero format 100, underflow format 101, or denormalized format 102.

Comparator 30 generates an asserted signal if the bits $f_{msb} \ldots f_{lsb+5}$ of the fraction field of the operand in the operand buffer 11 are all binary one's, which may be the case if the operand is in the de-normalized format 102, normalized nonzero format 103, overflow format 104, or NaN format 106.

Comparator 31 generates an asserted signal if the bits $f_{msb} \ldots f_{lsb+5}$ of the fraction field of the operand in the operand buffer 11 are all binary zero's, which may be the case if the operand is in the zero format 100, underflow format 102, denormalized format 102, normalized non-zero format 103 or infinity format 105.

Comparator 32 generates an asserted signal if the bits $f_{lsb+4} \ldots f_{lsb}$ of the fraction field of the operand in the operand buffer 11 are all binary one's, which may be the case if the operand is in the de-normalized format 102 or normalized non-zero format 103 and which will be the case in the overflow format 104, or if all of the flags "n," "o," "u," "z," and "x" are set in the infinity format 105 or NaN format 106.

Comparator 33 generates an asserted signal if the bits $f_{lsb+4} \ldots f_{lsb+1}$ of the fraction field of the operand in the operand buffer 11 are binary zero's and the bit $f_{lsb}$ of the fraction field is a binary "one," which will be the case if the operand is in the underflow format 101 and which may be the case if the operand is in the denormalized format 102, normalized non-zero format 103, or if the flags "n," "o," "u," and "z" are clear and the flag "x" is set in the infinity 105 or NaN format 106.

Comparator 34 generates an asserted signal if all of the bits $f_{lsb+4} \ldots f_{lsb+1}$ of the fraction field of the operand in the operand buffer 11 are binary zero's, which will be the case if the operand is in the zero format 100, and which may be the case if the operand is in the denormalized format 102, normalized non-zero format 103, or if the flags "n," "o," "u," "z" and "x" are clear in the infinity format 105 or NaN format 106.

Gates 35–42 respond to the output of the above mentioned comparators to identify the status of the operand in operand buffer 11. In the exemplary embodiment, AND gate 35 will generate an asserted signal if comparators 31 and 34 are both generating asserted signals. This will be the case if the bits $f_{msb} \ldots f_{lsb}$ of the fraction field of the operand in the operand buffer 11 have the bit pattern 00000000000000000000000.

AND gate 36 will generate an asserted signal if comparators 22, 31 and 33 are all generating asserted signals. This will be the case if the bits $e_{msb} \ldots e_{lsb}$ of the fraction field of the operand in the operand buffer 11 have the bit pattern 00000000 and the bits $f_{msb} \ldots f_{lsb}$ of the fraction field of the operand in the operand buffer 11 have the bit pattern 00000000000000000000001, in which case the operand is in the underflow format 101.

AND gate 37 will generate an asserted signal if comparators 21, 30 and 32 are all generating asserted signals. This will be the case if the bits $e_{msb} \ldots e_{lsb}$ of the fraction field of the operand in the operand buffer 11 have the bit pattern 11111110 and the bits $f_{msb} \ldots f_{lsb}$ of the fraction field of the operand in the operand buffer 11 have the bit pattern 11111111111111111111111, in which case the operand is in the overflow format 104.

NAND gate 38 will generate an asserted signal if the comparator 20 is generating an asserted signal and the comparator 31 is generating a negated signal. This will be the case if the bits $e_{msb} \ldots e_{lsb}$ of the fraction field of the operand in the operand buffer 11 have the bit pattern 11111111 and at least one of bits $f_{msb} \ldots f_{lsb+4}$ of the fraction field of the operand in the operand buffer 11 has the value "one," in which case the operand is in the NaN format 106.

AND gate 39 will generate an asserted signal if the comparator 20 is generating an asserted signal and the comparator 31 is generating an asserted signal. This will be the case if the bits $e_{msb} \ldots e_{lsb}$ of the fraction field of the operand in the operand buffer 11 have the bit pattern 11111111 and the bits $f_{msb} \ldots f_{lsb+4}$ of the fraction field of the operand in the operand buffer 11 have the bit pattern 00000000000000000, in which case the operand is in the infinity format 105.

NAND gate 40 will generate an asserted signal if the comparator 22 is generating an asserted signal and AND gates 35 and 36 are generating negated signals. This will be the case if the bits $e_{msb} \ldots e_{lsb}$ of the fraction field of the operand in the operand buffer 11 have the bit pattern 00000000, at least one of the bits $f_{msb} \ldots f_{lsb}$ of the fraction field of the operand in the operand buffer 11 has the value "one," and the operand is not in the underflow format 101, in which case the operand is in the denormalized format 102.

AND gate 41 will generate an asserted signal if the comparator 22 is generating an asserted signal and AND gate 35 is generating an asserted signal. This will be the case if the bits $e_{msb} \ldots e_{lsb}$ of the fraction field of the operand in the operand buffer 11 have the bit pattern 00000000 and the bits $f_{msb} \ldots f_{lsb}$ of the fraction field of the operand in the operand buffer 11 have the bit pattern 00000000000000000000000, in which case the operand is in the zero format 100.

Finally, NAND gate 42 will generate an asserted signal if the AND gate 37 and comparators 20 and 22 are all generating negated signals. This will be the case if the operand is in the normalized non-zero format 103.

In the exemplary embodiment, the result generator circuit 13 essentially includes four sections, including an A/B signal decoder section 50, an AB negated section 51, an AB non-negated section 52 and a combiner section 53. The AB negated section 51 receives the signals from the operand analysis circuit 12 and control signals C–K and generates a signal (referred to as the AB NEG signal) out of AND gate 91 representative of a result as described above in connection with items (a) through (j). Similarly, the AB non-negated section 52 receives the signals from the operand analysis circuit 12 and control signals C–K and generates a signal (referred to as the AB NON-NEG signal) out of AND gate 92 representative of a result as described above in connection with items (k) through (s). The A/B signal decoder 50 receives control signals A–B and a signal representative of the sign bit of the operand in operand buffer 11 to generate gating signals. These gating signals enable the combiner section 53 to selectively gate one or none of the AB NEG signal or the AB NON-NEG signal as a preliminary result signal (i.e., the signal generated by gate 93 and referred to as PRE). The combiner section 53 also receives the L control signal which controls the generation of the result signal (i.e., the output of gate 94) as either the true or complement of the PRE signal.

Looking at the exemplary embodiment in more detail, the A/B signal decoder 50 includes NAND gate 60, AND gate 61, NAND gate 62 and OR gate 63. The NAND gate 60 receives the control signals A–B and generates an asserted signal if both are negated. The AND gate 61 receives the B signal and a signal representative of the sign bit of the operand in operand buffer 11 and generates an asserted signal if both are asserted. It will be appreciated that if the signal representative of the sign bit is asserted, the operand will be negative. The NAND gate 62 receives control signal A and a signal representative of the sign bit of the operand in operand buffer 11 and generates an asserted signal if the A signal is asserted and the signal representative of the sign bit is negated, the operand will be positive. The OR gate 63 receives the signals from both AND gate 61 and NAND gate 62 and generates an asserted signal if either signal is asserted.

Accordingly, the OR gate 63 will generate an asserted signal if:

(A) the A and B control signals are both asserted, regardless of the sign of the operand in operand buffer 11, (B) the B control signal is asserted and the operand in operand buffer 11 is negative, or (C) the A control signal is asserted and the operand buffer 11 is positive.

The exemplary AB negated section 51 includes logic gates 70–80. In more detail, AND gate 70 (see reference item (a) above) generates an asserted signal if the signal from comparator 20, a signal representative of bit $f_{lsb+4}$ of the fraction field of the operand in operand buffer 11, and the C control signal are all asserted. It will be appreciated that the AND gate 70 will generate an asserted signal if the operand in operand buffer 11 is in the infinity format 105 or NaN format 106, the invalid operation flag "n" is set and the C control signal is asserted.

AND gate 71 (see reference item (b) above) generates an asserted signal if the signal from comparator 20, a signal representative of bit $f_{lsb+3}$ of the fraction field of the operand in operand buffer 11, and the D control signal are all asserted. It will be appreciated that the AND gate 71 will generate an asserted signal if the operand in operand buffer 11 is in the infinity format 105 or NaN format 106, the overflow flag "o" is set and the D control signal is asserted.

AND gate 72 (see reference item (c) above) generates an asserted signal if the signal from comparator 20, a signal representative of bit $f_{lsb+2}$ of the fraction field of the operand in operand buffer 11, and the E control signal are all asserted. It will be appreciated that the AND gate 72 will generate an asserted signal if the operand in operand buffer 11 is in the infinity format 105 or NaN format 106, the underflow flag "u" is set and the E control signal is asserted.

AND gate 73 (see reference item (d) above) generates an asserted signal if the signal from comparator 20, a signal representative of bit $f_{lsb+1}$ of the fraction field of the operand in operand buffer 11, and the F control signal are all asserted It will be appreciated that the AND gate 73 will generate an asserted signal if the operand in operand buffer 11 is in the infinity format 105 or NaN format 106, the divide-by-zero flag "z" is set and the F control signal is asserted.

AND gate 74 (see reference item (e) above) generates an asserted signal if the signal from comparator 20, a signal representative of bit $f_{lsb}$ of the fraction field of the operand in operand buffer 11, and the G control signal are all asserted. It will be appreciated that the AND gate 74 will generate an asserted signal if the operand in operand buffer 11 is in the infinity format 105 or NaN format 106, the inexact flag "x" is set and the G control signal is asserted.

AND gate 75 (see reference item (f) above) generates an asserted signal if the signal from AND gate 37 and the H control signal are both asserted, it will be appreciated that the AND gate 74 will generate an asserted signal if the operand in operand buffer 11 is in the overflow format 104 and the H control signal is asserted.

AND gate 76 (see reference item (g) above) generates an asserted signal if the signal from AND gate 36 and the I control signal are both asserted. It will be appreciated that the AND gate 74 will generate an asserted signal if the operand in operand buffer 11 is in the underflow format 101 and the I control signal is asserted.

NAND gate array 77 (see reference item (i) above) generates an asserted signal if the signal from comparator 20 is negated, the J control signal is asserted and the K control signal is negated, the signals from AND gates 36 and 37 are negated and a signal representative of bit $f_{lsb}$ of the fraction field of the operand in operand buffer 11 is asserted. Furthermore, those skilled in the art will appreciate that the NAND gate array 77 will generate an asserted signal if:

(A) the J control signal is asserted and the K control signal is negated, AND (B) the operand in operand buffer 11 in the denormalized format 102 or the normalized non-zero format 103, AND (C) the inexact flag "x" is set.

NAND gate 78 (see reference item (h) above) generates an asserted signal if the signal from NAND gate 40 is asserted and if the J control signal is negated and the K control signal is asserted. It will be appreciated that the NAND gate 78 will generate an asserted signal if the operand in operand buffer 11 is the denormalized format 102 and the J control signal is negated and the K control signal is asserted.

NAND gate 79 (see reference item (j) above) generates an asserted signal if the signal from NAND gate 40 is asserted, if the signal representative of the bit $f_{lsb}$ of the fraction field of the operand in operand buffer 11 is asserted, and the J and K control signals are both asserted. It will be appreciated and the NAND gate 78 will generate an asserted signal if:

(A) the J and K control signals are both asserted, AND (B) the operand in operand buffer 11 is in the denormalized format 102, AND (C) the inexact flag "x" is set.

(i) Finally, the AB negated section 51 also includes an OR network 80, which generates an asserted signal if the signal from any of AND or NAND gates 70 through 79 is asserted.

The exemplary AB non-negated section 52 includes logic gates 81–90. In more detail, AND gate 81 (see reference item (k) above) generates an asserted signal if the signal from NAND gate 38 and the C control signal are both asserted. This will be the case if the operand in operand buffer 11 is in the NaN format 106 and the C control signal is asserted.

AND gate 82 (see reference item (I) above) generates an asserted signal if the signal from AND gate 39 and the D control signal are both asserted. This will be the case if the operand in operand buffer 11 is in the infinity format 105 and the D control signal is asserted.

AND gate 83 (see reference item (m) above) generates an asserted signal if the signal from AND gate 37 and the E control signal are both asserted. This will be the case if the operand in operand buffer 11 is in the overflow format 104 and the E control signal is asserted.

NAND gate 84 (see reference item (n) above) generates an asserted signal if the signal from NAND gate 42 is asserted, a signal representative of the bit $f_{lsb}$ of the operand in operand buffer 11 is negated and the F control signal is asserted. This will be the case if the operand in operand buffer 11 is in the normalized non-zero 103 with the inexact flag "x" clear and the F control signal is asserted.

AND gate 85 (see reference item (o) above) generates an asserted signal if the signal from AND gate 42 is asserted, a signal representative of the bit $f_{lsb}$ of the operand in operand buffer 11 is asserted and the G control signal is asserted. This will be the case if the operand in operand buffer 11 is in the normalized non-zero format 103 with the inexact flag "x" set and the G control signal is asserted.

AND gate 86 (see reference item (p) above) generates an asserted signal if the NAND gate 40 is generating an asserted signal, a signal representative of the bit $f_{lsb}$ of the operand in operand buffer 11 is negated and the H control signal is asserted. This will be the case if the operand buffer 11 is in the denormalized format 102 with the inexact "x" clear and the H control signal asserted.

NAND gate 87 (see reference item (q) above) generates an asserted signal if the NAND gate 40 is generating an asserted signal, a signal representative of the bit $f_{lsb}$ of the operand in operand buffer 11 is asserted and the I control signal is asserted. This will be the case if the operand in operand buffer 11 is in the denormalized format 102 with the inexact flag "x" set and the I control signal asserted.

AND gate 88 (see reference item (r) above) generates an asserted signal if the AND gate 36 is generating an asserted signal and the J control signal is asserted. This will be the case if the operand in operand buffer 11 is in the underflow format 101 with the J control signal asserted.

(ii) AND gate 89 (see reference item (s) above) generates an asserted signal if the AND gate 41 is generating an asserted signal and the K control signal is asserted. This will be the case if the operand in operand buffer 11 is in the zero format 100 with the K control signal asserted.

(iii) Finally, the AB non-negated section 52 includes OR network 90, which generates an asserted signal if the signal from any of AND or NAND gates 81 through 89 is asserted.

The combiner section 53 receives the signals from OR network 80, OR network 90 and the L control signal, as well as tagging signals generated by the NAND gate 60 and OR gate 63 of the A/B signal decoder 50. Based upon these received signals, combiner section 53 generates the result signal. If the NAND 60 generates an asserted signal, which will be the case if both A and B control signals are negated (reference items (a) through (j) above), an AND gate 91 will be enabled to gate the signal from the OR network 80 of the A/B negated section 51 to one input of an OR gate 93 as an A/B NEG RES partial result signal.

However, it will be appreciated that OR gate 63 generates an asserted signal if:

(A) both A and B control signals are asserted, (B) the B control signal is asserted and a signal representative of the sign bit of the operand is also asserted (i.e., the operand in operand buffer 11 is negative), or (C) the A control signal is asserted and a signal representative of the sign bit of the operand is negated (i.e., the operand in operand buffer 11 is positive), (see reference items (k) through (s) above). If OR gate 63 generates the asserted signal, AND gate 92 will be enabled to gate the signal from the OR network 90 of the AB non-negated section 52 to the other input of OR gate 93 as an A OR B NON-NEG RES partial result signal. It will be appreciated that, since only one of NAND gate 60 or OR gate 63 will be generating an asserted signal at any point in time, at most one of A/B NEG RES and A or B NON-NEG RES will be asserted. On the other hand, it will also be appreciated that neither partial result signal may be asserted. If either the A/B NEG RES or the A OR B NON-NEG RES partial result signal is asserted, the OR gate 93 generates an asserted PRE preliminary result signal, which is coupled to an XOR gate 94. The XOR gate 94 also receives the L control signal and generates the result signal that corresponds to the PRE preliminary result signal if the L control signal is negated and complements the PRE preliminary result signal if the L control signal is asserted.

It will be appreciated that a plurality of the C through K control signals may be asserted at any point in time for a given operand. This advantageously enables the tester unit 10 to test for the existence of more than one status condition contemporaneously on the given operand. Thus, a control unit (not shown) may be able to collectively use results from tests for multiple status conditions as part of processing a floating point instruction or conditioning the outcome of a conditional floating point operation.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided into the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A floating point operand testing circuit for identifying a status of a floating point operand, comprising:
   an analysis circuit configured to determine the status of the floating point operand based upon data within the floating point operand; and
   a result generator circuit coupled to the analysis circuit and being responsive to at least one control signal, the result generator being configured to assert a result signal if the floating point analysis circuit indicates the floating point status is of a predetermined format specified by the at least one control signal,
   wherein the data within the floating point operand encodes the status in the predetermined format, the predetermined format being from a group comprising not-a-number (NaN), infinity, normalized, denormalized, invalid operation, overflow, underflow, division by zero, exact, and inexact; and
   the predetermined format for the NaN comprises a plurality of bits indicative of a predetermined type of operand condition resulting in the NaN status.

2. The floating point operand testing circuit of claim 1 further comprising an operand buffer coupled to the analysis circuit, the operand buffer configured to supply the floating point operand to the analysis circuit.

3. The floating point operand testing circuit of claim 1 wherein the result generator circuit is responsive to at least one of a plurality of control signals that are asserted when testing the floating point operand for one of a plurality of predetermined formats.

4. The floating point operand testing circuit of claim 1 wherein the predetermined format represents one of a +OV status and a −OV status.

5. The floating point operand testing circuit of claim 1 wherein the predetermined format represents one of a +UN status and a −UN status.

6. The floating point operand testing circuit of claim 1, wherein the predetermined format represents one of a positive infinity status and a negative infinity status.

7. The floating point operand testing circuit of claim 1, wherein the predetermined format comprises a plurality of bits indicative of a predetermined type of operand condition resulting in the infinity status.

8. The floating point operand testing circuit of claim 1, wherein the result signal is used to condition the outcome of a floating point instruction.

9. A floating point operand testing circuit for identifying a status of a floating point operand, comprising:
   an analysis circuit configured to determine the status of the floating point operand based upon data within the floating point operand; and
   a result generator circuit coupled to the analysis circuit and being responsive to at least one control signal, the result generator being configured to assert a result signal if the floating point analysis circuit indicates the floating point status is of a predetermined format specified by the at least one control signal,
   wherein the data within the floating point operand encodes the status in the predetermined format.
   the predetermined format representing a combination of at least two of the group comprising not-a-number (NaN), infinity, normalized, denormalized, invalid operation, overflow, underflow, division by zero, exact, and inexact.

10. The floating point operand testing circuit of claim 9, further comprising an operand buffer coupled to the analysis circuit, the operand buffer being configured to supply the floating point operand to the analysis circuit.

11. The floating point operand testing circuit of claim 9, wherein the result generator circuit is responsive to at least one of a plurality of control signals that are asserted when testing the floating point operand for one of a plurality of predetermined formats.

12. The floating point operand testing circuit of claim 9, wherein the result signal is used to condition the outcome of a floating point instruction.

13. A floating point operand testing circuit for identifying a status of a floating point operand, comprising:
   an analysis circuit configured to determine the status of the floating point operand based upon data within the floating point operand; and
   a result generator circuit coupled to the analysis circuit and being responsive to at least one control signal, the result generator being configured to assert a result signal if the floating point analysis circuit indicates the floating point status is of a predetermined format specified by the at least one control signal,
   wherein the result generator is further operative to update the result signal to indicate the floating point operand is of an alternative format specified by an updated value of the at least one control signal.

14. The floating point operand testing circuit of claim 13, wherein the alternative format is from a group comprising not-a-number (NaN), infinity, normalized, denormalized, invalid operation, overflow, underflow, division by zero, exact, and inexact.

15. The floating point operand testing circuit of claim 13, further comprising an operand buffer coupled to the analysis circuit, the operand buffer being configured to supply the floating point operand to the analysis circuit.

16. The floating point operand testing circuit of claim 13, wherein the result generator circuit is responsive to at least one of a plurality of control signals that are asserted when testing the floating point operand for one of a plurality of predetermined formats.

17. The floating point operand testing circuit of claim 13, wherein the result signal is used to condition the outcome of a floating point instruction.

18. A floating point operand testing circuit for identifying a status of a floating point operand, comprising:
   an analysis circuit configured to determine the status of the floating point operand based only on the contents of the floating point operand;
   an operand buffer coupled to the analysis circuit and configured to store the floating point operand encoded with the status; and
   a result generator circuit coupled to the analysis circuit and being responsive to at least one control signal, the result generator providing a result signal indicative of whether the status of the floating point operand conforms to a predetermined format associated with the at least one control signal, wherein the predetermined format is from a group comprising not-a-number (NaN), infinity, normalized, denormalized, invalid operation, overflow, underflow, division by zero, exact, and inexact, and the predetermined format for the NaN comprises a plurality of bits indicative of a predetermined type of operand condition resulting in the NaN status.

19. The floating point operand testing circuit of claim 18, wherein the at least one control signal is one of a plurality of control signals asserted in order to test the floating point operand for different status conditions.

20. The floating point operand testing circuit of claim 18, wherein the predetermined format represents one of a +OV status and a −OV status.

21. The floating point operand testing circuit of claim 18, wherein the predetermined format represents one of a +UN status and a −UN status.

22. The floating point operand testing circuit of claim 18, wherein the predetermined format represents one of a positive infinity status and a negative infinity status.

23. The floating point operand testing circuit of claim 18, wherein the result generator circuit provides the result signal to a floating point instruction processing device that conditions the outcome of a floating point instruction based upon the value of the result signal.

24. A method for testing a floating point status condition of a floating point operand, comprising:

(a) receiving the floating point operand related to a floating point instruction;

(b) determining the floating point status of the operand from only the contents of the floating point operand;

(c) receiving at least one control signal; and (d) generating a result signal to indicate whether the status of the floating point operand conforms to a predetermined format associated with the at least one control signal, wherein the predetermined format is from a group comprising not-a-number (NaN), infinity, normalized, denormalized, invalid operation, overflow, underflow, division by zero, exact, and inexact; and the predetermined format for the NaN comprises a plurality of bits indicative of a predetermined type of operand condition resulting in the NaN status.

25. The method of claim 24 further comprising repeating stages (c) and (d) on the same operand.

26. The method of claim 24 further comprising conditioning the outcome of the floating point instruction based upon the value of the result signal.

27. The method of claim 24, wherein the predetermined format represents one of a +OV status and a −OV status.

28. The method of claim 24, wherein the predetermined format represents one of a +UN status and a −UN status.

29. The method of claim 24, wherein the predetermined format represents one of a positive infinity status and a negative infinity status.

30. A computer-readable medium on which is stored a set of instructions for testing a floating point status condition of a floating point operand, which when executed perform steps comprising:

(a) receiving the floating point operand;

(b) determining the floating point status of the operand from only the contents of the floating point operand;

(c) receiving at least one control signal; and (d) generating a result signal to indicate whether the status of the floating point operand conforms to a predetermined format associated with the at least one control signal, wherein the predetermined format is from a group comprising not-a-number (NaN), infinity, normalized, denormalized, invalid operation, overflow, underflow, division by zero, exact, and inexact; and the predetermined format for the NaN comprises a plurality of bits indicative of a predetermined type of operand condition resulting in the NaN status.

31. The computer-readable medium of claim 30 further comprising repeating stages (c) and (d) on the same operand.

32. The computer-readable medium of claim 30 further comprising conditioning the outcome of a floating point instruction based upon the value of the result signal.

33. The computer-readable medium of claim 30, wherein the predetermined format represents one of a +OV status and a −OV status.

34. The computer-readable medium of claim 30, wherein the predetermined format represents one of a +UN status and a −UN status.

35. The computer-readable medium of claim 30, wherein the predetermined format represents one of a positive infinity status and a negative infinity status.

* * * * *